United States Patent
Motwani et al.

(10) Patent No.: US 10,073,658 B2
(45) Date of Patent: Sep. 11, 2018

(54) OPTIMIZED CACHING OF SLICES BY A DS PROCESSING UNIT

(71) Applicant: International Business Machines Corporation, Armonk, NY (US)

(72) Inventors: Manish Motwani, Chicago, IL (US); Ethan S. Wozniak, Park Ridge, IL (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/353,157

(22) Filed: Nov. 16, 2016

(65) Prior Publication Data

US 2017/0153978 A1 Jun. 1, 2017

Related U.S. Application Data

(60) Provisional application No. 62/260,735, filed on Nov. 30, 2015.

(51) Int. Cl.
*G11C 29/00* (2006.01)
*G06F 3/06* (2006.01)
(Continued)

(52) U.S. Cl.
CPC ............ *G06F 3/067* (2013.01); *G06F 3/064* (2013.01); *G06F 3/0619* (2013.01); *G06F 3/0629* (2013.01); *G06F 3/0644* (2013.01); *G06F 3/0665* (2013.01); *G06F 3/0689* (2013.01); *G06F 9/4881* (2013.01);
(Continued)

(58) Field of Classification Search
None
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Daniel McMahon
(74) *Attorney, Agent, or Firm* — Garlick & Markison; Timothy W. Markison; Shayne X. Short

(57) ABSTRACT

A computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations. A computing device receives a data access request involving a set of EDSs associated with a data object that are distributedly stored among storage units (SUs) including first SU(s) coupled via a local network of the DSN and second SU(s) remotely located to the computing device and coupled via an external network of the DSN. The computing device caches within the at least one memory therein a subset of EDSs stored within the second SU(s) remotely located to the computing device and coupled to the computing device via the external network.

20 Claims, 8 Drawing Sheets

(51) Int. Cl.

| | |
|---|---|
| *G06F 11/14* | (2006.01) |
| *G06F 11/10* | (2006.01) |
| *H03M 13/15* | (2006.01) |
| *G06F 9/48* | (2006.01) |
| *G06F 9/50* | (2006.01) |
| *G06F 12/0866* | (2016.01) |
| *G06F 12/0891* | (2016.01) |
| *G06F 15/173* | (2006.01) |
| *H03M 13/00* | (2006.01) |
| *H04L 29/06* | (2006.01) |
| *H04L 29/12* | (2006.01) |

(52) U.S. Cl.
CPC ........ *G06F 9/5083* (2013.01); *G06F 11/1076* (2013.01); *G06F 11/1092* (2013.01); *G06F 11/1402* (2013.01); *G06F 11/1464* (2013.01); *G06F 12/0866* (2013.01); *G06F 12/0891* (2013.01); *G06F 15/17331* (2013.01); *H03M 13/1515* (2013.01); *G06F 2201/84* (2013.01); *G06F 2211/1007* (2013.01); *G06F 2212/1024* (2013.01); *G06F 2212/154* (2013.01); *G06F 2212/263* (2013.01); *G06F 2212/403* (2013.01); *H03M 13/616* (2013.01); *H03M 13/6502* (2013.01); *H04L 61/1582* (2013.01); *H04L 61/6004* (2013.01); *H04L 63/101* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 * | 11/2004 | Moulton ............. G06F 11/1076 711/114 |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1* | 1/2003 | Gadir ................. G06F 11/2005 714/4.11 |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1* | 4/2009 | Gladwin ............. H04L 67/1097 709/203 |
| 2010/0023524 A1* | 1/2010 | Gladwin ................ G06F 3/0617 707/E17.032 |
| 2011/0029742 A1* | 2/2011 | Grube .................. G06F 9/4401 711/154 |
| 2014/0351631 A1* | 11/2014 | Grube ................. G06F 11/1076 714/6.23 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

(56) References Cited

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

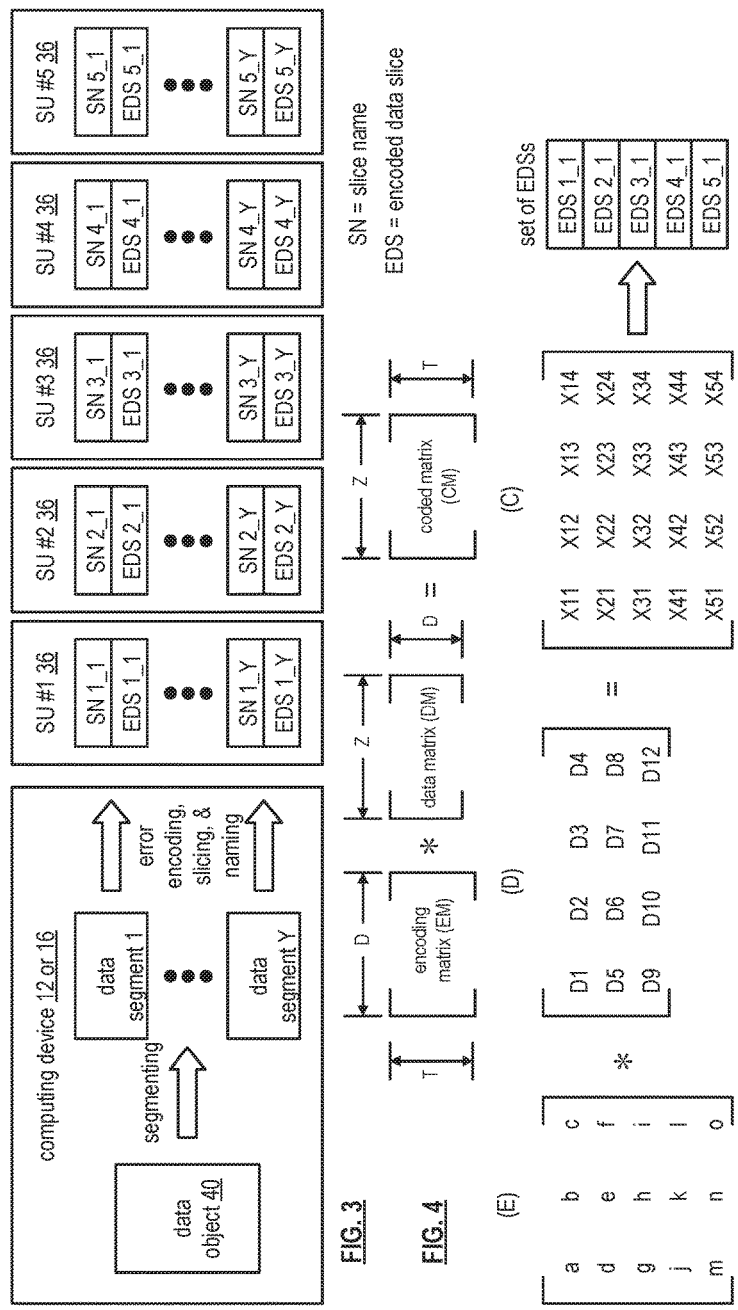

1100

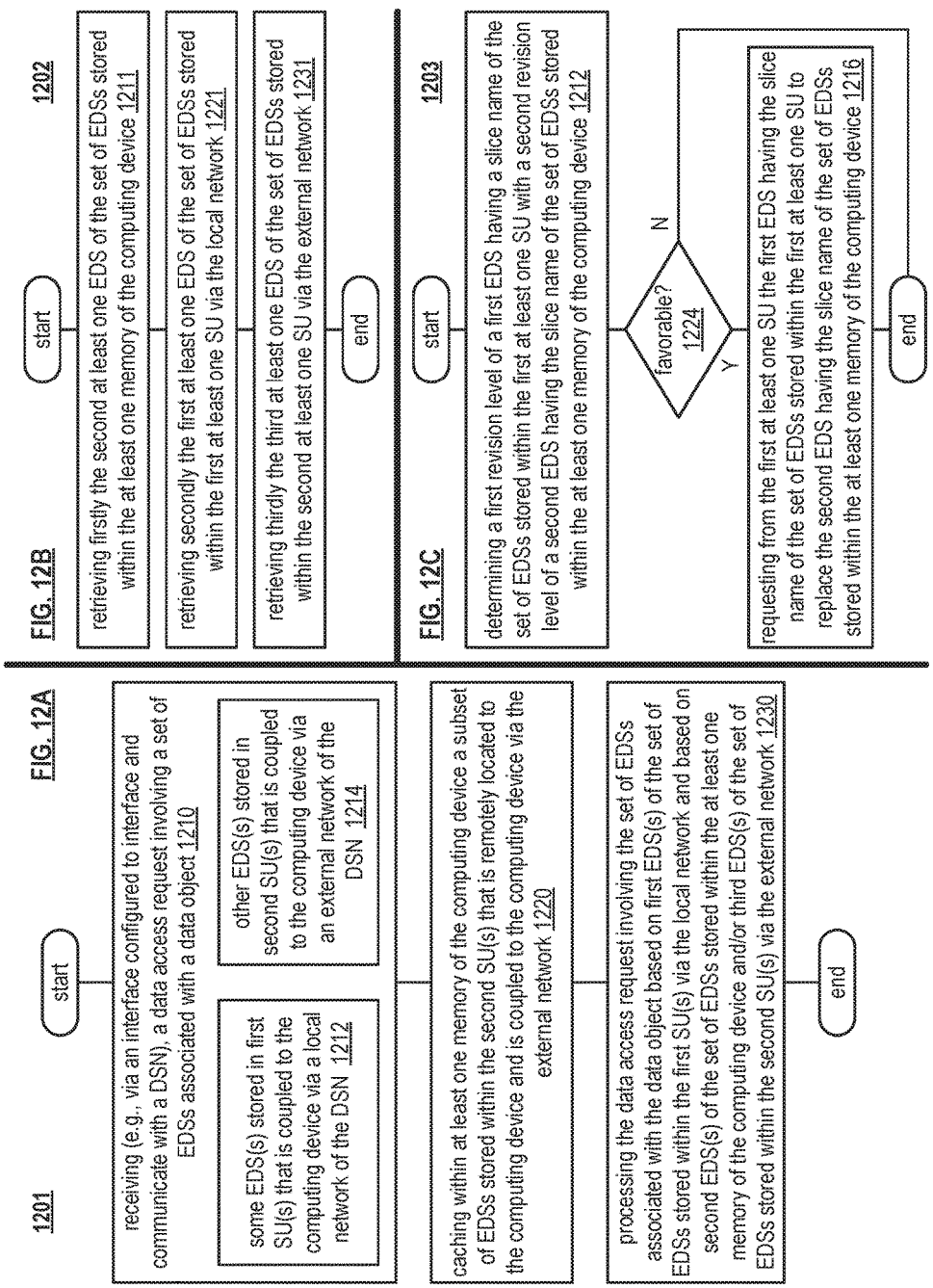

OPTIMIZED CACHING OF SLICES BY A DS PROCESSING UNIT

CROSS REFERENCE TO RELATED PATENTS

The present U.S. Utility Patent Application claims priority pursuant to 35 U.S.C. § 119(e) to U.S. Provisional Application No. 62/260,735, entitled "ACCESSING COPIES OF DATA STORED IN A DISPERSED STORAGE NETWORK," filed Nov. 30, 2015, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Data storage systems do not adequately store information therein effectively so that users can always be guaranteed immediate access to data requested. For example, as data is stored in remote locations throughout such as a data storage system, requests for such data may be slowly serviced. There continues to be a need in the art for improvement so as to service data access requests more effectively.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 12A is a diagram illustrating an embodiment of a method for execution by one or more computing devices in accordance with the present invention;

FIG. 12B is a diagram illustrating an embodiment of another method for execution by one or more computing devices in accordance with the present invention; and FIG. 12C is a diagram illustrating an embodiment of another method for execution by one or more computing devices in accordance with the present invention.

DETAILED DESCRIPTION OF THE INVENTION

Figure 1:
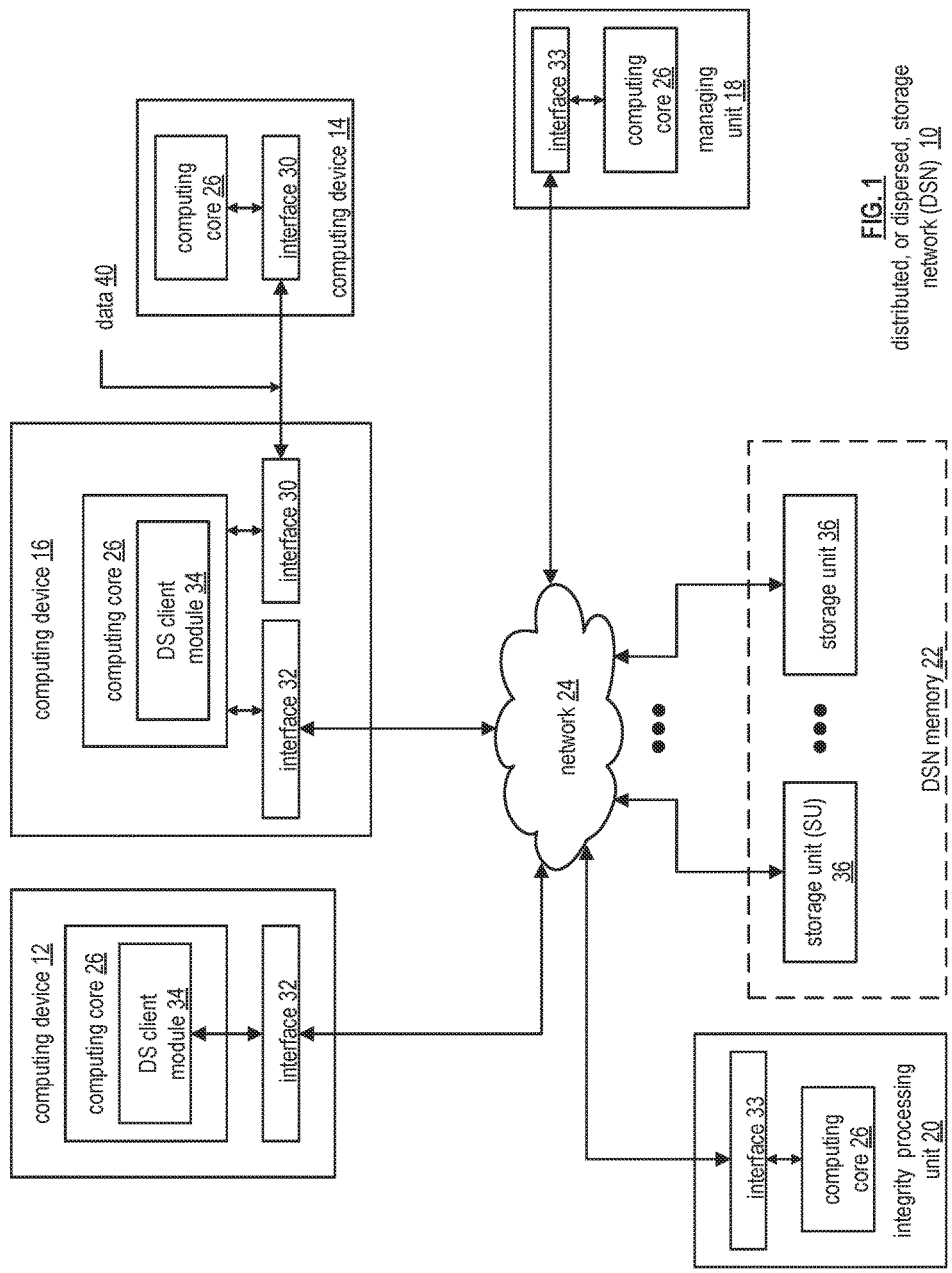
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
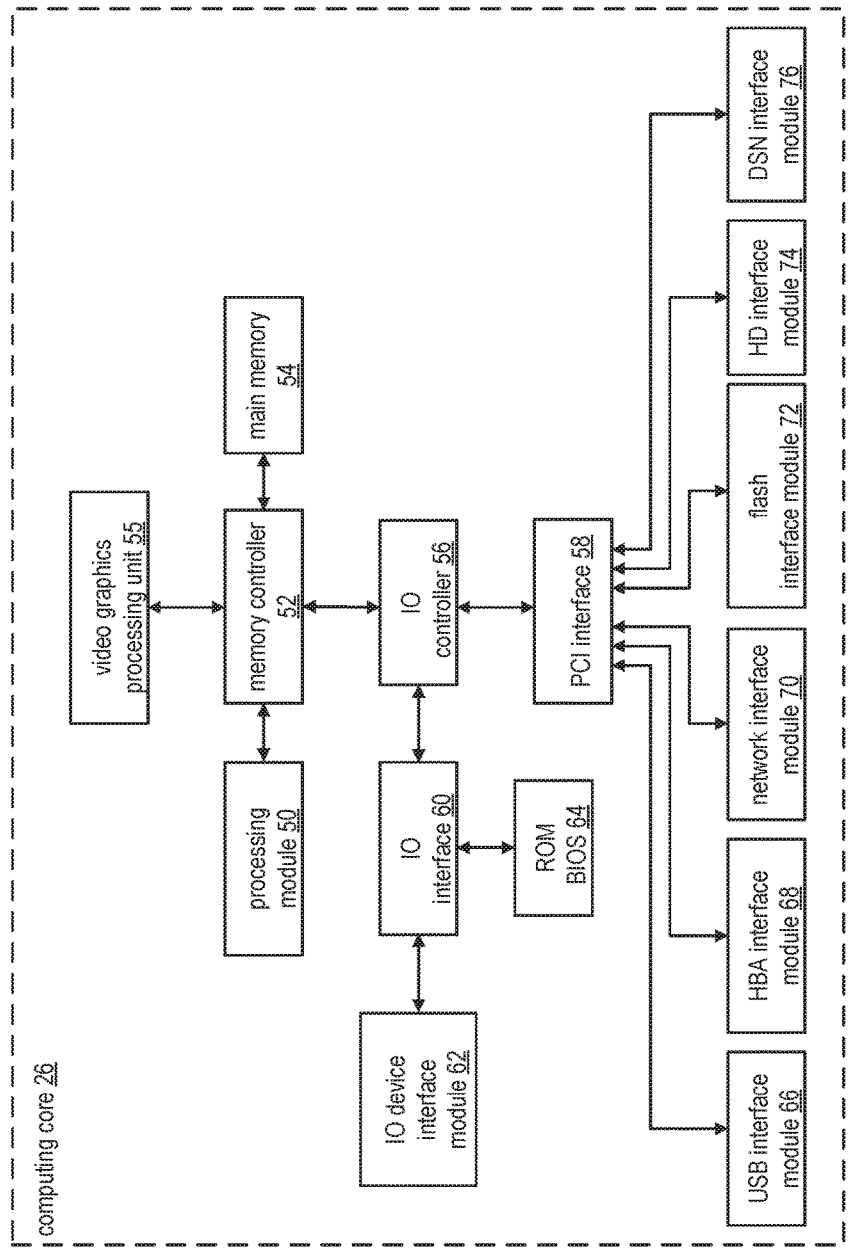
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
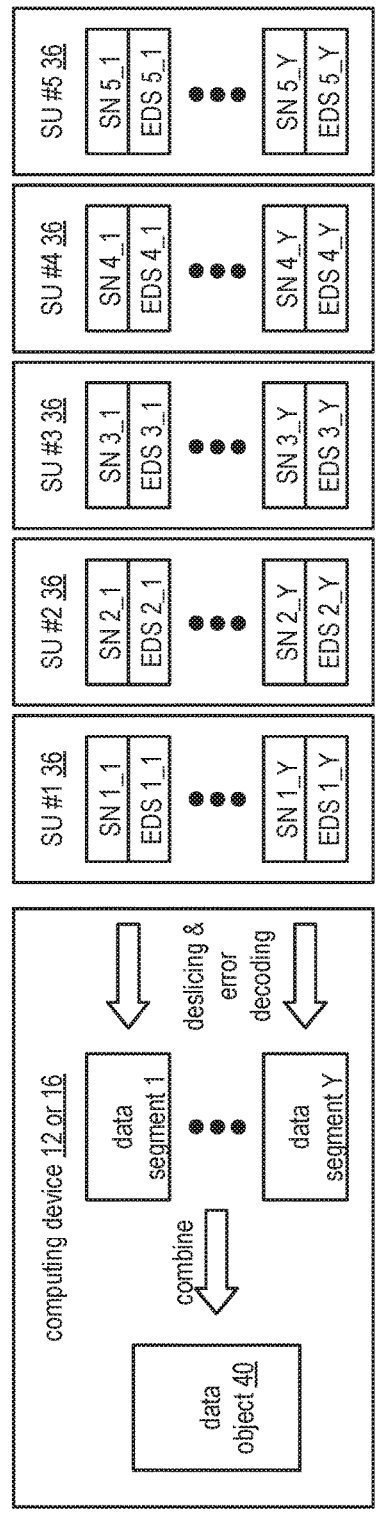
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
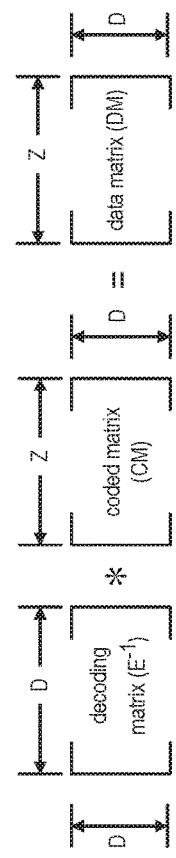
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
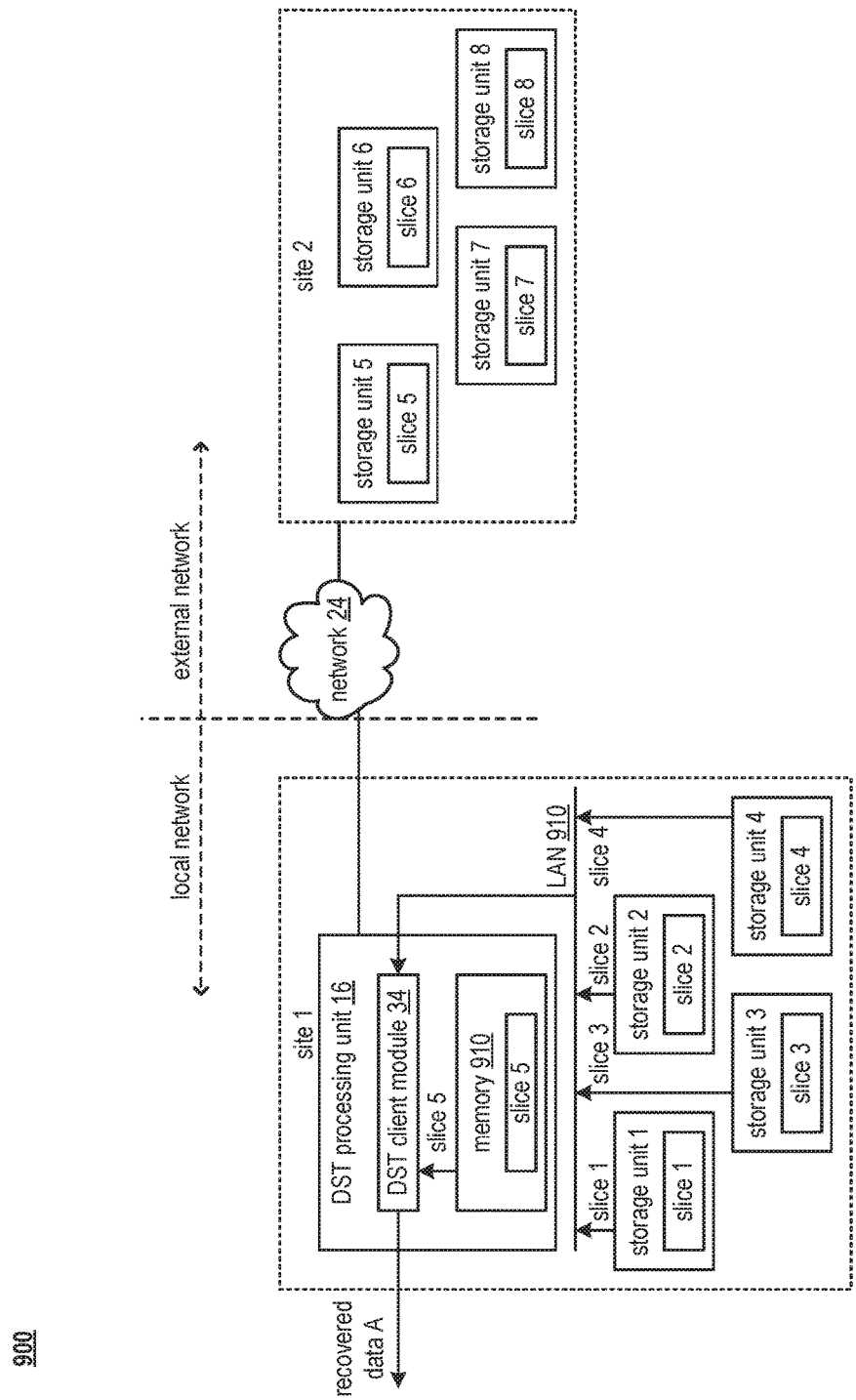
FIG. 9 is a schematic block diagram of another embodiment of a dispersed storage network (DSN) in accordance with the present invention.

FIG. 9 is a schematic block diagram of another embodiment of a dispersed storage network (DSN) that includes the network 24 of FIG. 1, a set of storage units 1-8 such as based on SUs 36 such as with respect to FIG. 3 or FIG. 7, and the distributed storage and task (DST) processing unit 16 that may be implemented utilizing the computing device 12, 14, 16, the managing unit 18, and/or the integrity processing unit 20 such as with respect to FIG. 1, a SU 36 such as with respect to FIG. 3 or FIG. 7, and/or any other device implemented within a DSN to perform operations associated with a DST processing unit. The DST processing unit 16 includes the DST client module 34 and a memory. The memory may be implemented utilizing the memory 88 of FIG. 3. Each storage unit may be implemented utilizing the DST execution unit that may be implemented utilizing the computing device 12, 14, 16, the managing unit 18, and/or the integrity processing unit 20 such as with respect to FIG. 1, a SU 36 such as with respect to FIG. 3 or FIG. 7, and/or any other device implemented within a DSN to perform operations associated with a DST execution unit. A first portion of the set of storage units are implemented along with the DST processing unit 16 at a first site and remaining storage units of the set of storage units are implemented at a second site, where the first portion of storage units are operably coupled to the DST processing unit 16 by a local area network (LAN). The network 24 may include the LAN.

The first portion of the set of storage units includes less than a decode threshold number of storage units, where data A is dispersed storage error encoded to produce at least one set of an IDA width number of encoded data slices 1-8, where a decode threshold number of encoded data slices of each of the at least one set of encoded data slices are required to reproduce the data, and where the at least one set of encoded data slices is stored in the set of storage units such that less than the decode threshold number of encoded data slices are stored within the first portion of storage units of the first site. The DSN functions to enhance data retrieval performance.

In an example of operation of the enhanced data retrieval, where one or more encoded data slices of each of the one or more sets of encoded data slices are cached in the memory as cached encoded data slices, where one or more encoded data slices of the set of encoded data slices are stored in one or more local storage units (e.g., the first portion of storage units 1-4 at the site 1), and where remaining encoded data slices of the set of encoded data slices are stored in one or more remote storage units (e.g., storage units 5-8 and the site 2), the DST client module 34 retrieves one or more cached encoded data slices of the set of encoded data slices from the memory. The retrieving includes identifying available Encoded data slices and retrieving the identified available cash encoded data slices from the memory. For example, the DST processing unit 34 identifies available encoded data slice 5 and retrieves the encoded data slice 5 from the memory.

Having retrieved the one or more encoded data slices, the DST client module 34 initiates retrieval of a sufficient number of encoded data slices that are stored in the one or more local storage units to produce the decode threshold number of encoded data slices including the retrieve one or more cached encoded data slices. The initiating includes identifying the number of the sufficient number of encoded data slices and retrieving, via the LAN, the identified encoded data slices from the one or more local storage units. The identifying of the sufficient number includes computing the sufficient number as the decode threshold number might of the number of retrieved cached encoded data slices (e.g., 5−1=4). For example, the DST client module 34 calculates a need for four more slices, identifies encoded data slices 1-4 as stored in the storage units 1-4 and retrieves, via the LAN, the encoded data slices 1-4 from the local storage units 1-4.

When receiving an insufficient number of encoded data slices within a recovery timeframe, the DST client module 34 retrieves at least some of the remaining encoded data slices from the one or more rewards storage units to produce the decode threshold number of encoded data slices. The retrieving includes determining a number of the remaining encoded data slices, issuing read slice requests for the number of remaining encoded data slices, and receiving the number of remaining encoded data slices.

When receiving the decode threshold number of encoded data slices, the DST client module 34 dispersed storage error decodes the received decode threshold number of encoded data slices to produce recover data A. When updating the stored data, the DST client module 34 facilitates storage of the updated one or more encoded data slices in the one or more local storage units such that the decode threshold number of encoded data slices may be recovered from the memory and the one or more local storage units.

Figure 10:
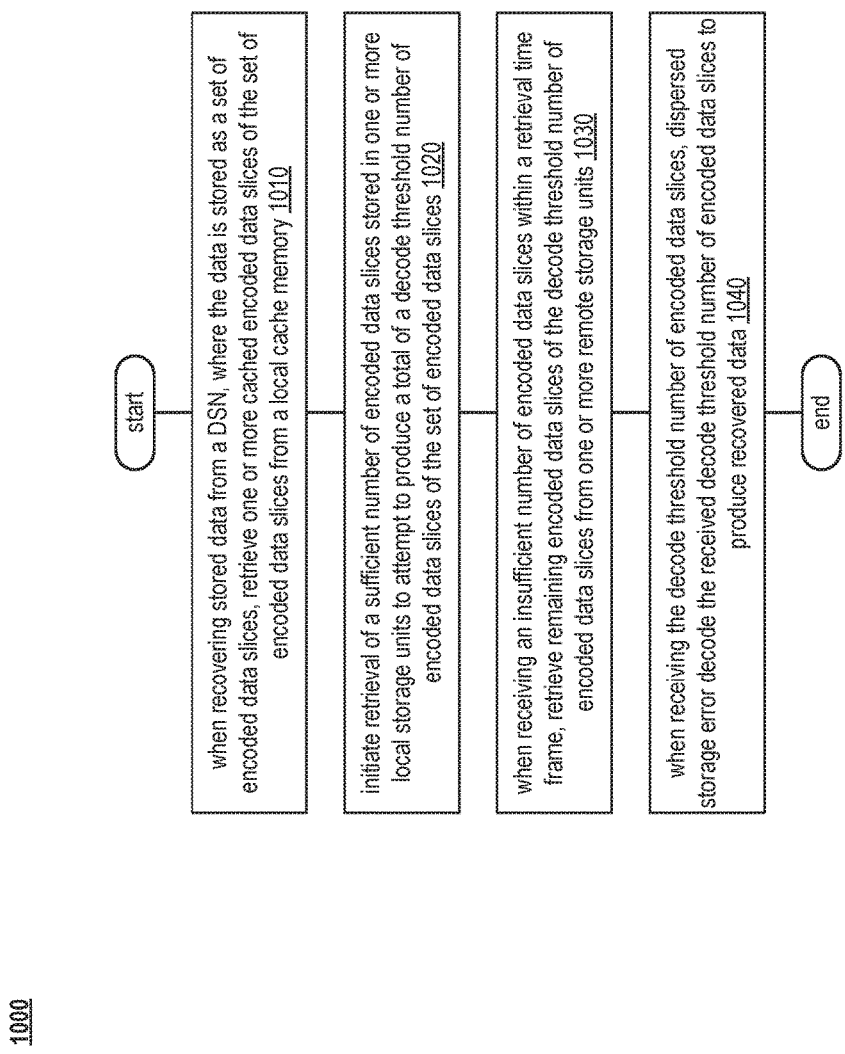
FIG. 10 is a flowchart illustrating an example of enhancing data retrieval performance in accordance with the present invention.

FIG. 10 is a flowchart illustrating an example of enhancing data retrieval performance. The method 1000 includes a step 1010 where a processing module (e.g., of a distributed storage and task (DST) client module), when recovering stored data from a DSN, where the data is stored as a set of encoded data slices retrieves one or more cached encoded data slices of the set of encoded data slices from a local cache memory. The data is dispersed storage error encoded to produce one or more sets of encoded data slices, where one or more encoded data slices of each set of encoded data slices is cached in the local cache memory as cached encoded data slices, where one or more encoded data slices of the set of encoded data slices are stored in one or more local storage units, where remaining encoded data slices of the set of encoded data slices are stored in one or more of storage units, and where a decode threshold number of encoded data slices of the set of encoded data slices are required to recover the data. The retrieving includes identifying available cached encoded data slices and retrieving the identified available cached encoded data slices from the local cache memory.

The method 1000 continues at the step 1020 where the processing module initiates retrieval of a sufficient number of encoded data slices stored in the one or more local storage units to attempt to produce a total of a decode threshold number of encoded data slices of the set of encoded data slices. The initiating includes identifying the decode threshold number, determining a number of the sufficient number of encoded data slices for retrieval, and a determined number of encoded data slices from the one or more local storage units.

When receiving an insufficient number of encoded data slices within a retrieval timeframe, the method 1000 continues at the step 1030 where the processing module retrieves remaining encoded data slices of the decode threshold number of encoded data slices from one or more remote storage units. The retrieving includes determining a number of remaining encoded data slices, issuing read slice requests for the number of remaining encoded data slices to the one or more remote storage units, and receiving the number of remaining encoded data slices. When receiving the decode threshold number of encoded data slices, the method 1000 continues at step 1040 where the processing module disperse storage error decodes the received decode threshold number of encoded data slices to produce recovered data.

Figure 11:
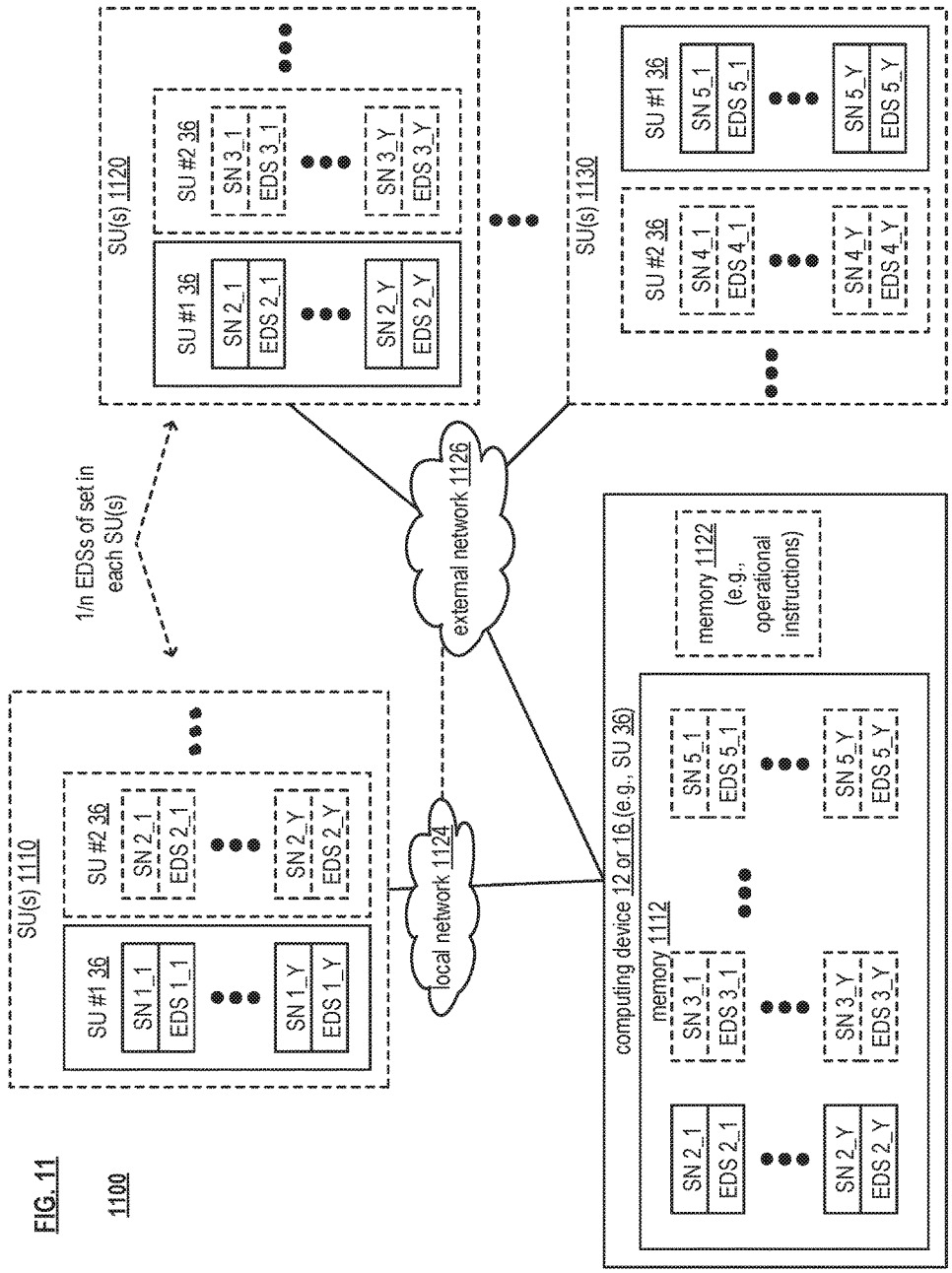
FIG. 11 is a schematic block diagram of another embodiment of a DSN in accordance with the present invention.

FIG. 11 is a schematic block diagram of another embodiment 1100 of a DSN in accordance with the present invention. A computing device 12 or 16 includes at least one memory (e.g., memory 1112 and/or memory 1122). The memory 1112 may be implemented to store encoded data slices (EDSs) and/or operational instructions for use by a processing module of the computing device 12 or 16. In some examples, the memory 1112 stores the EDSs, and another memory 1122 stores the operational instructions for use by a processing module of the computing device 12 or 16. The computing device 12 or 16 is in communication with different respective SUs (e.g., first SU(s) 1110 that includes one or more SUs 36, second SU(s) 1120 that includes one or more SUs 36, third SU(s) 1110 that includes one or more SUs 36, etc.). Note that different respective EDSs (e.g., SN and EDS of various numbers) may be stored in different respective SUs throughout the DSN. The computing device 12 or 16 is in communication with the first SU(s) 1110 via a local network 1124 and is in communication with the second SU(s) 1120 and the third SU(s) 1130 via a local network 1126. Note that each SU(s) 1110, 1120, and 1130 may store different respective EDSs (e.g., SN and EDS of various numbers. In one example, that SU(s) 1110 store SN 1_1, EDS 1_1 through SN 1_Y, EDS 1_Y, and SU(s) 1120 store SN 2_1, EDS 2_1 through SN 2_Y, EDS 2_Y, and SU(s) 1120 store SN 4_1, EDS 4_1 through SN 4_Y, EDS 4_Y. In another example, that SU(s) 1110 store SN 1_1, EDS 1_1 through SN 1_Y, EDS 1_Y and SN 2_1, EDS 2_1 through SN 2_Y, EDS 2_Y, and SU(s) 1120 store SN 2_1, EDS 2_1 through SN 2_Y, EDS 2_Y and SN 3_1, EDS 3_1 through SN 3_Y, EDS 3_Y, and SU(s) 1120 store SN 4_1, EDS 4_1 through SN 4_Y, EDS 4_Y through SN 5_1, EDS 5_1 through SN 5_Y, EDS 5_Y. In some examples, approximately 1/n (where n is a positive integer such as greater than or equal to 2) of the EDSs of a set of EDSs are stored in each of the SU(s) 110, 1120, and so on.

In an example of operation and implementation, a computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations.

In an example, the computing device 12 of 16 receives a data access request involving a set of EDSs associated with a data object that are distributedly stored among a plurality of storage units (SUs) that includes a first at least one SU that is coupled to the computing device via a local network of the DSN and a second at least one SU that is remotely located to the computing device and is coupled to the computing device via an external network of the DSN.

Note that the data object is segmented into a plurality of data segments, and a data segment of the plurality of data segments is dispersed error encoded in accordance with dispersed error encoding parameters to produce the set of EDSs. A decode threshold number of EDSs are needed to recover the data segment, a read threshold number of EDSs provides for reconstruction of the data segment, and a write threshold number of EDSs provides for a successful transfer of the set of EDSs from a first at least one location in the DSN to a second at least one location in the DSN.

The computing device 12 of 16 then caches within the at least one memory (e.g., memory 1112) a subset of EDSs stored within the second at least one SU that is remotely located to the computing device and is coupled to the computing device via the external network 1126 (e.g., SU(s) 1120). The computing device 12 of 16 then processes the data access request involving the set of EDSs associated with the data object based on a first at least one EDS of the set of EDSs stored within the first at least one SU via the local network (e.g., SU(s) 1120) and based on a second at least one EDS of the set of EDSs stored within the at least one memory of the computing device (e.g., memory 1112) and/or a third at least one EDS of the set of EDSs stored within the second at least one SU via the external network (e.g., SU(s) 1130).

In some examples, the computing device 12 of 16 retrieves firstly the second at least one EDS of the set of EDSs stored within the at least one memory of the computing device, then retrieves secondly the first at least one EDS of the set of EDSs stored within the first at least one SU via the local network, and retrieves thirdly the third at least one EDS of the set of EDSs stored within the second at least one SU via the external network.

Also, in other examples, the computing device 12 or 16 is configured to process the data access request involving the set of EDSs associated with the data object including to retrieve the decode threshold number of EDSs, the read threshold number of EDSs, and/or the write threshold number of EDSs from the first at least one EDS of the set of EDSs stored within the first at least one SU via the local network and the second at least one EDS of the set of EDSs stored within the at least one memory of the computing device.

Also, in even other examples, the computing device 12 or 16 operates to determine a first revision level of a first EDS having a slice name of the set of EDSs stored within the first at least one SU with a second revision level of a second EDS having the slice name of the set of EDSs stored within the at least one memory of the computing device. Then, when the first revision level compares unfavorably to the second revision level, the computing device 12 or 16 operates to request from the first at least one SU the first EDS having the slice name of the set of EDSs stored within the first at least one SU to replace the second EDS having the slice name of the set of EDSs stored within the at least one memory of the computing device.

In some examples, the computing device 12 or 16 operates to process the data access request involving the set of EDSs associated with the data object such that the set of EDSs associated with the data are distributedly stored among the plurality of SUs that includes n SUs, wherein n is a positive integer greater than or equal to 2, such that a first approximately 1/n EDSs are stored within the first at least one SU and a second approximately 1/n EDSs are stored within the second at least one SU. Then, the computing device 12 or 16 operates to cache within the at least one memory a sufficient number of EDSs stored within the second at least one SU that is remotely located to the computing device and is coupled to the computing device via the external network so that at least one of the decode threshold number of EDSs, the read threshold number of EDSs, or the write threshold number of EDSs may be retrieved from the at least one memory and the first at least one SU.

Note that the computing device may be located at a first premises that is remotely located from at least one SU of the primary SUs or plurality of secondary SUs the within the DSN. Also, note that the computing device may be of any of a variety of types of devices as described herein and/or their equivalents including a SU of any group and/or set of SUs within the DSN, a wireless smart phone, a laptop, a tablet, a personal computers (PC), a work station, and/or a video game device. Note also that the DSN may be implemented to include or be based on any of a number of different types of communication systems including a wireless communication system, a wire lined communication systems, a non-public intranet system, a public internet system, a local area network (LAN), and/or a wide area network (WAN).

FIG. 12A is a diagram illustrating an embodiment of a method 1201 for execution by one or more computing devices in accordance with the present invention.

The method 1201 begins in step 1210 by receiving, via an interface configured to interface and communicate with a dispersed storage network (DSN), a data access request involving a set of encoded data slices (EDSs) associated with a data object. In some examples, the EDS are distributedly stored among a plurality of storage units (SUs) that includes a first at least one SU that is coupled to the computing device via a local network of the DSN as shown in step 1212 and a second at least one SU that is remotely located to the computing device and is coupled to the computing device via an external network of the DSN as shown in step 1214.

The method 1201 continues in step 1220 by caching within at least one memory of the computing device a subset of EDSs stored within the second at least one SU that is remotely located to the computing device and is coupled to the computing device via the external network.

The method 1201 then operates in step 1230 by processing the data access request involving the set of EDSs associated with the data object based on a first at least one EDS of the set of EDSs stored within the first at least one SU via the local network and based on at least one of a second at least one EDS of the set of EDSs stored within the at least one memory of the computing device or a third at least one EDS of the set of EDSs stored within the second at least one SU via the external network.

FIG. 12B is a diagram illustrating an embodiment of another method 1202 for execution by one or more computing devices in accordance with the present invention. Such operations of the method 1202 may involve processing the data access request involving the set of EDSs associated with the data object. The method 1202 begins in step 1211 by retrieving firstly the second at least one EDS of the set of EDSs stored within the at least one memory of the computing device. The method 1202 continues in step 1221 by retrieving secondly the first at least one EDS of the set of EDSs stored within the first at least one SU via the local network. The method 1202 then operates in step 1231 by retrieving thirdly the third at least one EDS of the set of EDSs stored within the second at least one SU via the external network.

FIG. 12C is a diagram illustrating an embodiment of another method 1203 for execution by one or more computing devices in accordance with the present invention.

The method 1203 begins in step 1212 by determining a first revision level of a first EDS having a slice name of the set of EDSs stored within the first at least one SU with a second revision level of a second EDS having the slice name of the set of EDSs stored within the at least one memory of the computing device. The method 1203 continues in step 1224 by determining whether the first revision level compares unfavorably to the second revision level. When the first revision level compares unfavorably to the second revision level, the method 1203 then operates in step 1226 by requesting from the first at least one SU the first EDS having the slice name of the set of EDSs stored within the first at least one SU to replace the second EDS having the slice name of the set of EDSs stored within the at least one memory of the computing device.

A DS processing unit might cache entire segments or objects restored via the information dispersal algorithm (IDA) to enable efficient reads of those segments or objects. However, depending on the location of the DS processing unit, this may be a non-optimal use of the DS processing units memory. A DS unit deployed at one of the sites of a three-site DSN memory has access to ⅓rd of the DS units with site-local network latencies and speeds. An optimized DS processing unit might therefore cache only ⅔rds of an IDA threshold number of slices, with those slices corresponding to slices held by DS units at remote sites. Therefore it uses only ⅔rds the memory necessary to cache that full segment, set of EDSs, and/or object (thereby enabling it to cache 50% more segments/objects) than it otherwise would have been capable of caching for the same amount of memory. Upon a request for any object for which it contains slices in cache, the DS processing unit will issue local reads to ⅓rd IDA Threshold number of the DS processing at the same site as the DS processing unit. In general, such an implementation may be based on n-site (where n is a positive integer, such as greater than or equal to 2) DSN memory has access to 1/n of the DS units with site-local network latencies and speeds. An optimized DS processing unit might therefore cache only 2/n or (3/n, 4/n, or so on) of an IDA threshold number of slices, with those slices corresponding to slices held by DS units at remote sites. Therefore it uses only 2/n (or 3/m, 4/n, or so on) the memory necessary to cache that full segment or object (thereby enabling it to cache 50% more segments/objects) than it otherwise would have been capable of caching for the same amount of memory. Upon a request for any object for which it contains slices in cache, the DS processing unit will issue local reads to 1/n IDA Threshold number of the DS processing at the same site as the DS processing unit These reads will return very quickly since they go out over the local network of the site. Once the DS processing unit has these additional slices, it can reassemble the full source from the slices it already has in cache, and satisfy the request. If, on the other hand, the DS processing unit gets slices with revisions different from those in its cache, it will have to issue additional reads to other DS units. It can achieve a threshold of a higher revision slice, then it will invalidate the slices of the old revision in its cache, and replace them with revisions of the new slices from the remote DS units it retrieved and/or re-generated, rebuilt, etc. To make this novel strategy even more resilient with only a slight increase in memory, the DS processing unit may cache a few additional slices corresponding to DS units remote from its site (e.g., EDSs from one or more SUs that are remotely located there from such as via an external network). Therefore if some local DS units fail, it will remain capable of satisfying requests using the few extra remote slices in its cache.

In a specific example, consider a DSN that stores 500 clients that are all requesting the same data over and over again. The DSN is implemented such that at least one device can locally store some information (e.g., EDSs). Also, instead of storing all information (e.g., EDSs), the DSN may be implemented to keep some information (e.g., EDSs) stored locally and keep it decoded in the local station for security. This way, even if a bad agent were to hack into the system, that bad agent could not retrieve the data because it is encoded format.

A computing device can be implemented in the same local network as at least one other SU (e.g., have a local network connection to that at least one SU), and the computing device can have that other SU store some if its information. Also, the computing device can use this as checks and balances (e.g., checking the revision higher from an SU on the local network, and then know that is locally stored copy is outdated).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a dispersed storage network (DSN);
at least one memory that stores operational instructions and at least some encoded data slices (EDSs); and
a processing module operably coupled to the interface and to the at least one memory, wherein the processing module, when operable within the computing device based on the operational instructions, is configured to:
receive a data access request involving a set of EDSs associated with a data object that are distributedly stored among a plurality of storage units (SUs) that includes a first at least one SU that is coupled to the computing device via a local network of the DSN and a second at least one SU that is remotely located to the computing device and is coupled to the computing device via an external network of the DSN, wherein the data object is segmented into a plurality of data segments, wherein a data segment of the plurality of data segments is dispersed error encoded in accordance with dispersed error encoding parameters to produce the set of EDSs, wherein a decode threshold number of EDSs are needed to recover the data segment, wherein a read threshold number of EDSs provides for reconstruction of the data segment, wherein a write threshold number of EDSs provides for a successful transfer of the set of EDSs from a first at least one location in the DSN to a second at least one location in the DSN;
cache within the at least one memory a subset of EDSs stored within the second at least one SU that is remotely located to the computing device and is coupled to the computing device via the external network; and
process the data access request involving the set of EDSs associated with the data object based on a first at least one EDS of the set of EDSs stored within the first at least one SU via the local network and based on at least one of a second at least one EDS of the set of EDSs stored within the at least one memory of the computing device or a third at least one EDS of the set of EDSs stored within the second at least one SU via the external network.

2. The computing device of claim 1, wherein the processing module, when operable within the computing device based on the operational instructions, is further configured to process the data access request involving the set of EDSs associated with the data object including to:
retrieve firstly the second at least one EDS of the set of EDSs stored within the at least one memory of the computing device;
retrieve secondly the first at least one EDS of the set of EDSs stored within the first at least one SU via the local network; and
retrieve thirdly the third at least one EDS of the set of EDSs stored within the second at least one SU via the external network.

3. The computing device of claim 1, wherein the processing module, when operable within the computing device based on the operational instructions, is further configured to process the data access request involving the set of EDSs associated with the data object including to:
retrieve at least one of the decode threshold number of EDSs, the read threshold number of EDSs, or the write threshold number of EDSs from the first at least one EDS of the set of EDSs stored within the first at least one SU via the local network and the second at least one EDS of the set of EDSs stored within the at least one memory of the computing device.

4. The computing device of claim 1, wherein the processing module, when operable within the computing device based on the operational instructions, is further configured to:
determine a first revision level of a first EDS having a slice name of the set of EDSs stored within the first at least one SU with a second revision level of a second EDS having the slice name of the set of EDSs stored within the at least one memory of the computing device; and
when the first revision level compares unfavorably to the second revision level, request from the first at least one SU the first EDS having the slice name of the set of EDSs stored within the first at least one SU to replace the second EDS having the slice name of the set of EDSs stored within the at least one memory of the computing device.

5. The computing device of claim 1, wherein the processing module, when operable within the computing device based on the operational instructions, is further configured to:
 process the data access request involving the set of EDSs associated with the data object such that the set of EDSs associated with the data object are distributedly stored among the plurality of SUs that includes n SUs, wherein n is a positive integer greater than or equal to 2, such that a first approximately 1/n EDSs are stored within the first at least one SU and a second approximately 1/n EDSs are stored within the second at least one SU; and
 cache within the at least one memory a sufficient number of EDSs stored within the second at least one SU that is remotely located to the computing device and is coupled to the computing device via the external network so that at least one of the decode threshold number of EDSs, the read threshold number of EDSs, or the write threshold number of EDSs may be retrieved from the at least one memory and the first at least one SU.

6. The computing device of claim 1, wherein:
 the computing device is located at a first premises that is remotely located from at least one SU of the plurality of SUs within the DSN; and
 the at least one memory includes a first memory that stores operational instructions and a second memory implemented that is separately from the first memory and that stores the at least some EDSs.

7. The computing device of claim 1 further comprising:
 a SU of the plurality of SUs within the DSN, a wireless smart phone, a laptop, a tablet, a personal computers (PC), a work station, or a video game device.

8. The computing device of claim 1, wherein the DSN includes at least one of a wireless communication system, a wire lined communication systems, a non-public intranet system, a public internet system, a local area network (LAN), or a wide area network (WAN).

9. A computing device comprising:
 an interface configured to interface and communicate with a dispersed storage network (DSN);
 at least one memory that stores operational instructions and at least some encoded data slices (EDSs); and
 a processing module operably coupled to the interface and to the at least one memory, wherein the processing module, when operable within the computing device based on the operational instructions, is configured to:
  receive a data access request involving a set of EDSs associated with a data object that are distributedly stored among a plurality of storage units (SUs) that includes n SUs, wherein n is a positive integer greater than or equal to 2, such that a first approximately 1/n EDSs are stored within a first at least one SU that is coupled to the computing device via a local network of the DSN and a second approximately 1/n EDSs are stored within a second at least one SU that is remotely located to the computing device and is coupled to the computing device via an external network of the DSN, wherein the data object is segmented into a plurality of data segments, wherein a data segment of the plurality of data segments is dispersed error encoded in accordance with dispersed error encoding parameters to produce the set of EDSs, wherein a decode threshold number of EDSs are needed to recover the data segment, wherein a read threshold number of EDSs provides for reconstruction of the data segment, wherein a write threshold number of EDSs provides for a successful transfer of the set of EDSs from a first at least one location in the DSN to a second at least one location in the DSN;
  cache within the at least one memory a subset of EDSs stored within the second at least one SU that is remotely located to the computing device and is coupled to the computing device via the external network; and
  process the data access request involving the set of EDSs associated with the data object based on a first at least one EDS of the set of EDSs stored within the first at least one SU via the local network and based on at least one of a second at least one EDS of the set of EDSs stored within the at least one memory of the computing device or a third at least one EDS of the set of EDSs stored within the second at least one SU via the external network including to:
   retrieve firstly the second at least one EDS of the set of EDSs stored within the at least one memory of the computing device; and
   retrieve secondly the first at least one EDS of the set of EDSs stored within the first at least one SU via the local network.

10. The computing device of claim 9, wherein the processing module, when operable within the computing device based on the operational instructions, is further configured to process the data access request involving the set of EDSs associated with the data object including to:
 retrieve at least one of the decode threshold number of EDSs, the read threshold number of EDSs, or the write threshold number of EDSs from the first at least one EDS of the set of EDSs stored within the first at least one SU via the local network and the second at least one EDS of the set of EDSs stored within the at least one memory of the computing device.

11. The computing device of claim 9, wherein the processing module, when operable within the computing device based on the operational instructions, is further configured to:
 determine a first revision level of a first EDS having a slice name of the set of EDSs stored within the first at least one SU with a second revision level of a second EDS having the slice name of the set of EDSs stored within the at least one memory of the computing device; and
 when the first revision level compares unfavorably to the second revision level, request from the first at least one SU the first EDS having the slice name of the set of EDSs stored within the first at least one SU to replace the second EDS having the slice name of the set of EDSs stored within the at least one memory of the computing device.

12. The computing device of claim 9 further comprising:
 a SU of the plurality of SUs within the DSN, a wireless smart phone, a laptop, a tablet, a personal computers (PC), a work station, or a video game device.

13. The computing device of claim 9, wherein the DSN includes at least one of a wireless communication system, a wire lined communication systems, a non-public intranet system, a public internet system, a local area network (LAN), or a wide area network (WAN).

14. A method for execution by a computing device, the method comprising:
 receiving, via an interface configured to interface and communicate with a dispersed storage network (DSN), a data access request involving a set of encoded data slices (EDSs) associated with a data object that are distributedly stored among a plurality of storage units (SUs) that includes a first at least one SU that is coupled to the computing device via a local network of the DSN and a second at least one SU that is remotely located to the computing device and is coupled to the computing device via an external network of the DSN, wherein the data object is segmented into a plurality of data segments, wherein a data segment of the plurality of data segments is dispersed error encoded in accordance with dispersed error encoding parameters to produce the set of EDSs, wherein a decode threshold number of EDSs are needed to recover the data segment, wherein a read threshold number of EDSs provides for reconstruction of the data segment, wherein a write threshold number of EDSs provides for a successful transfer of the set of EDSs from a first at least one location in the DSN to a second at least one location in the DSN;

caching within at least one memory of the computing device a subset of EDSs stored within the second at least one SU that is remotely located to the computing device and is coupled to the computing device via the external network; and processing the data access request involving the set of EDSs associated with the data object based on a first at least one EDS of the set of EDSs stored within the first at least one SU via the local network and based on at least one of a second at least one EDS of the set of EDSs stored within the at least one memory of the computing device or a third at least one EDS of the set of EDSs stored within the second at least one SU via the external network.

15. The method of claim 14, wherein the processing the data access request involving the set of EDSs associated with the data object further comprising:

retrieving firstly the second at least one EDS of the set of EDSs stored within the at least one memory of the computing device;

retrieving secondly the first at least one EDS of the set of EDSs stored within the first at least one SU via the local network; and retrieving thirdly retrieve the third at least one EDS of the set of EDSs stored within the second at least one SU via the external network.

16. The method of claim 14, wherein the processing the data access request involving the set of EDSs associated with the data object further comprising:

retrieving at least one of the decode threshold number of EDSs, the read threshold number of EDSs, or the write threshold number of EDSs from the first at least one EDS of the set of EDSs stored within the first at least one SU via the local network and the second at least one EDS of the set of EDSs stored within the at least one memory of the computing device.

17. The method of claim 14 further comprising:

determining a first revision level of a first EDS having a slice name of the set of EDSs stored within the first at least one SU with a second revision level of a second EDS having the slice name of the set of EDSs stored within the at least one memory of the computing device; and when the first revision level compares unfavorably to the second revision level, requesting from the first at least one SU the first EDS having the slice name of the set of EDSs stored within the first at least one SU to replace the second EDS having the slice name of the set of EDSs stored within the at least one memory of the computing device.

18. The method of claim 14 further comprising:

processing the data access request involving the set of EDSs associated with the data object such that the set of EDSs associated with the data object are distributedly stored among the plurality of SUs that includes n SUs, wherein n is a positive integer greater than or equal to 2, such that a first approximately 1/n EDSs are stored within the first at least one SU and a second approximately 1/n EDSs are stored within the second at least one SU; and caching within the at least one memory a sufficient number of EDSs stored within the second at least one SU that is remotely located to the computing device and is coupled to the computing device via the external network so that at least one of the decode threshold number of EDSs, the read threshold number of EDSs, or the write threshold number of EDSs may be retrieved from the at least one memory and the first at least one SU.

19. The method of claim 14, wherein the computing device is a SU of the plurality of SUs within the DSN, a wireless smart phone, a laptop, a tablet, a personal computers (PC), a work station, or a video game device.

20. The method of claim 14, wherein the DSN includes at least one of a wireless communication system, a wire lined communication systems, a non-public intranet system, a public internet system, a local area network (LAN), or a wide area network (WAN).

* * * * *